United States Patent
Massard et al.

(10) Patent No.: US 10,126,542 B1
(45) Date of Patent: Nov. 13, 2018

(54) METHOD OF CONTROLLING A SURFACE TREATMENT

(71) Applicant: Amazon Technologies, Inc., Seattle, WA (US)

(72) Inventors: Romaric Mathieu Massard, Eindhoven (NL); Hendrik Jan Hildebrand Tigelaar, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 14/788,525

(22) Filed: Jun. 30, 2015

(51) Int. Cl.
*G02B 26/00* (2006.01)
*G02B 26/08* (2006.01)
*G02F 1/29* (2006.01)
*B05D 3/06* (2006.01)

(52) U.S. Cl.
CPC ........... *G02B 26/005* (2013.01); *B05D 3/066* (2013.01)

(58) Field of Classification Search
USPC ....... 359/290, 292, 295, 296, 298, 237, 245, 359/265–267
See application file for complete search history.

(56) References Cited

U.S. PATENT DOCUMENTS

2014/0183516 A1* 7/2014 Newsome ........... H01L 51/0512 257/40
2015/0214486 A1* 7/2015 Tseng .................. H01L 51/0012 257/40

OTHER PUBLICATIONS

Emerson Y. Arashiro, Nicole R. DeMarquette "Use of the Pendant Drop Method to Measure Interfacial Tension between Molten Polymers" Revised Aug. 10, 1998. Materials Research, vol. 2, No. 1, pp. 23-32, 1999.

* cited by examiner

*Primary Examiner* — Brandi Thomas
(74) *Attorney, Agent, or Firm* — EIP US LLP

(57) ABSTRACT

A method comprising: treating a surface to change a surface energy of the surface, in dependence on at least one first parameter value of respectively at least one surface treatment control parameter which provides a surface treatment environment for treating the surface. The method further comprises: applying a first liquid part on a first area of the surface, the first liquid part having a meniscus with an edge contacting the surface; determining a first contact angle; determining, based on the first contact angle, at least one second parameter value of respectively the at least one surface treatment control parameter; and changing the at least one surface treatment control parameter based on the at least one second parameter value.

24 Claims, 8 Drawing Sheets

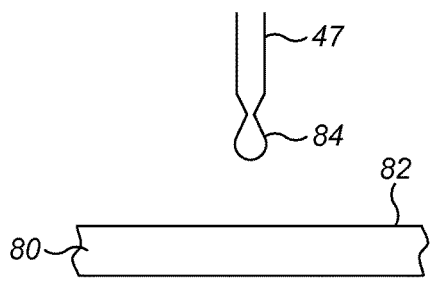
FIG. 7ai
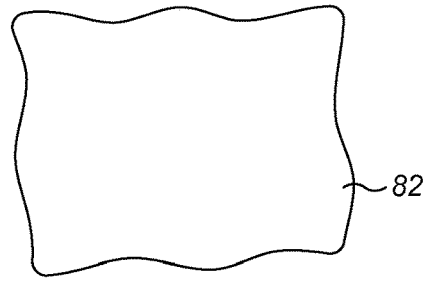
FIG. 7bi
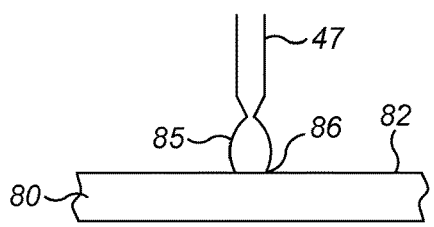
FIG. 7aii
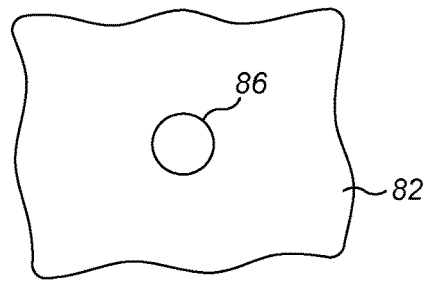
FIG. 7bii
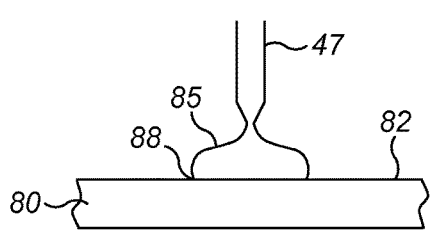
FIG. 7aiii
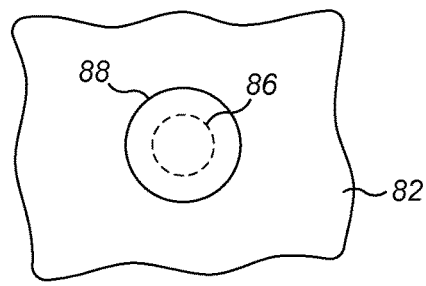
FIG. 7biii
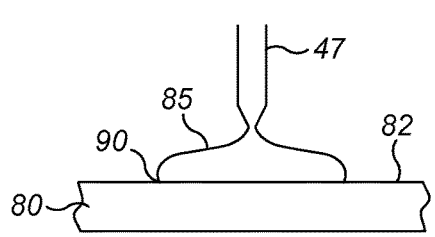
FIG. 7aiv
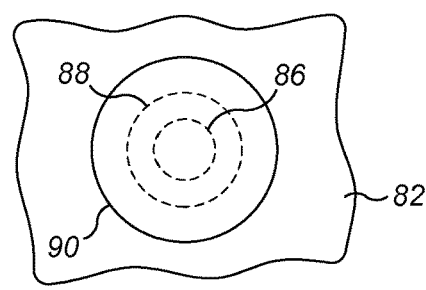
FIG. 7biv

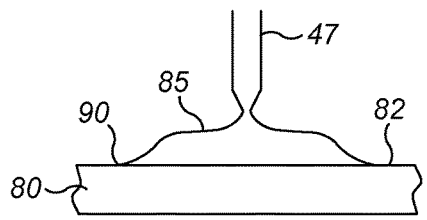
FIG. 7av
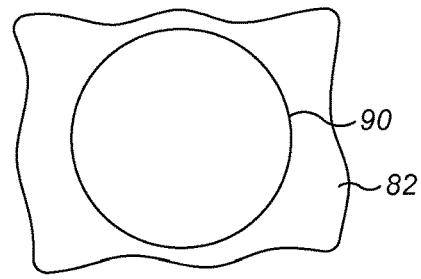
FIG. 7bv
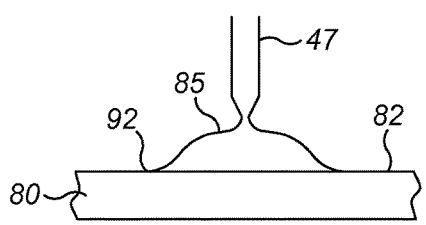
FIG. 7vi
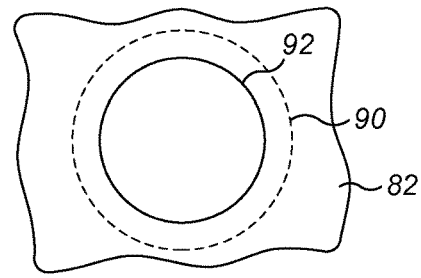
FIG. 7vi
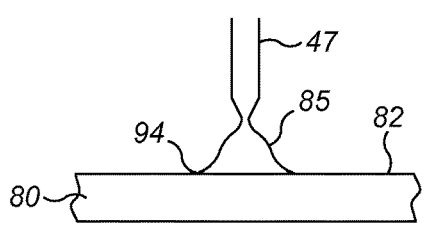
FIG. 7vii
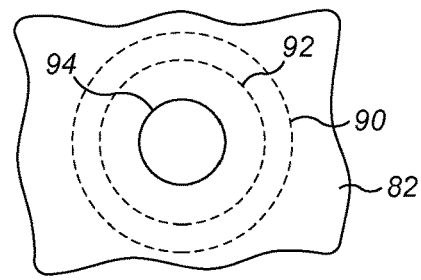
FIG. 7vii
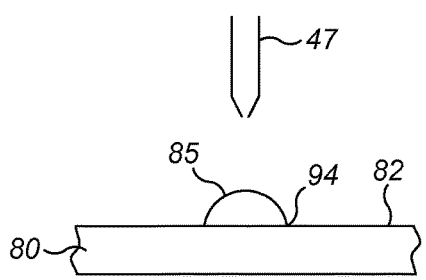
FIG. 7aviii
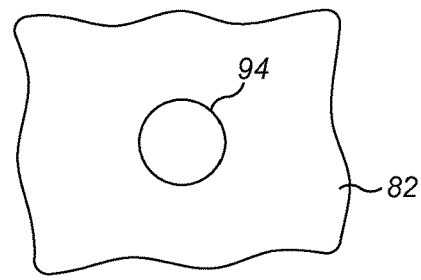
FIG. 7bviii

METHOD OF CONTROLLING A SURFACE TREATMENT

BACKGROUND

During manufacture of an electrowetting element, a surface may be treated to change the surface energy of the surface. For example, a surface may be treated to increase the hydrophilicity of the surface.

It is desirable to provide an efficient method for treating a surface to have a desired surface energy.

BRIEF DESCRIPTION OF DRAWINGS

FIGS. 7ai to 7aviii show schematically in cross-section part of a method of controlling treatment of a surface according to examples;

FIGS. 7bi to 7bviii correspond respectively with, and show in plan view, the part of the method shown in FIGS. 7ai to 7aviii;

DETAILED DESCRIPTION

Before describing examples of the method in detail, an example of an electrowetting element will first be given with reference to FIGS. 1 and 2, followed by an example of a support plate in FIG. 3 after having its surface energy changed using a treatment controlled by examples of the method described later, and then followed with reference to FIG. 4 an example of apparatus for controlling a method of treating a surface.

Figure 1:
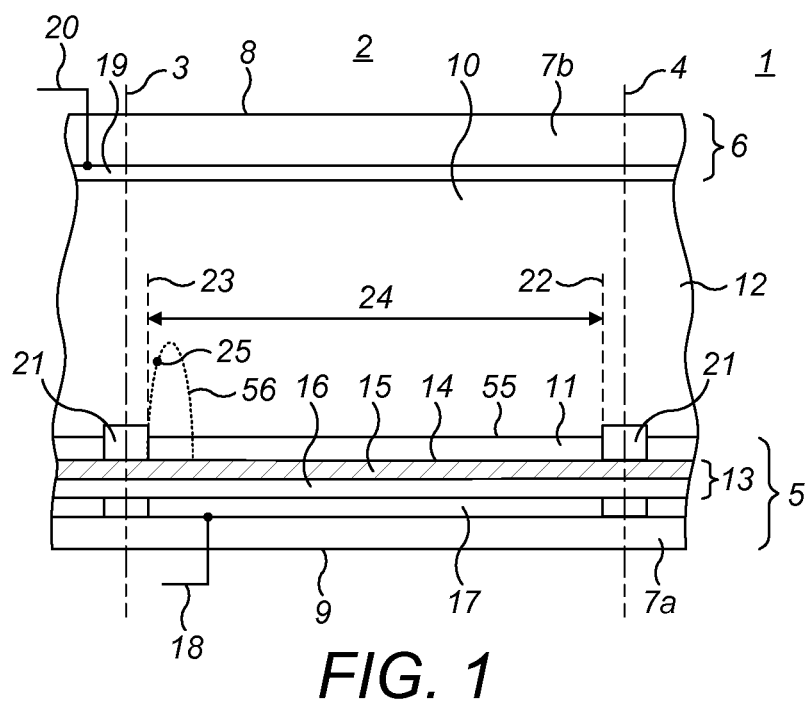
FIG. 1 shows schematically an example of an electrowetting element in cross-section.

FIG. 1 shows a diagrammatic cross-section of part of an example of an electrowetting display device 1, including a plurality of picture elements or display elements 2, one of which is shown in the Figure and which may also be referred to as an electrowetting pixel. Such a pixel or display element is an example of an electrowetting cell or an electrowetting element, the pixel or display element being an example of an electrowetting element for providing a display effect. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. The support plates in some examples include further layers and/or structures than illustrated, for example circuitry for controlling the display elements. Such features are not illustrated, for clarity.

The display device has a viewing side 8 on which an image or display formed by the display device can be viewed and a rear side 9. In the Figure a surface of the first support plate 5, which surface is in this example a surface of the substrate 7a, is the rear side 9; a surface of the second support plate 6, which surface is in this example a surface of the substrate 7b, is the viewing side 8; alternatively, in other examples, a surface of the first support plate may be the viewing side. The display device may be of the reflective, transmissive or transflective type. The display device may be an active matrix driven or a direct drive display device as the skilled person will understand. The plurality of display elements may be monochrome. For a colour display device the display elements may be divided in groups, each group having a different colour; alternatively, an individual display element may be able to show different colours.

A space 10, which may otherwise be considered to be a chamber, of each display element between the support plates is filled with two fluids, for example liquids. In the example of FIG. 1, the space 10 is filled with a first layer of liquid 11 and a second layer of liquid 12. The liquid of the second layer is substantially immiscible with the liquid of the first layer. Therefore, the first layer and the second layer do not substantially mix with each other and in some examples do not mix with each other to any degree. With the first and second layers substantially not mixing with each other, it is envisaged in some examples that there may be some degree of mixing of the first and second layers, but that this is considered negligible in that the majority of the volume of first layer is not mixed with the majority of the volume of the second layer. The substantial immiscibility of the first and second layers is due to the properties of the first and second layers, for example their chemical compositions; the first and second layers tend to remain separated from each other, therefore tending not to mix together to form a homogeneous mixture. Due to this immiscibility, the liquids of the first and second layers meet each other at an interface labelled 55 in FIG. 1 for when no voltage is applied and labelled 57 for when a voltage is applied, which interface defines a boundary between the volume of the liquid of the first layer and the volume of the liquid of the second layer; this interface or boundary may be referred to as a meniscus. The location and shape of the interface between the first layer and the second layer in examples is determined by the applied voltage. The thickness of the first and second layers in FIG. 1 is shown as an example; in other examples, the first and/or second layers may have different thicknesses.

The liquid of the second layer of the device is at least one of electrically conductive or polar, for example the liquid of the second layer is electrically conductive, polar, or both, and may be water, or a salt solution such as a solution of potassium chloride in water. The liquid of the second layer may be transparent; it may instead be coloured, for example, or absorbing. The liquid of the first layer of the device, which is electrically non-conductive, may for example include an alkane like decane or hexadecane, silicone oil or decalin (otherwise known as bicyclo-4,4,0-decane).

The liquid of the first layer may absorb at least a part of the visible spectrum. The liquid of the first layer may be transmissive for a part of the visible spectrum, forming a colour filter. For this purpose the liquid of the first layer may be coloured by addition of pigment particles or a dye such as the compound represented by general formula (3) described above. Alternatively, the liquid of the first layer may be black, for example absorb substantially all parts of the visible spectrum, or reflecting. A reflective liquid may reflect the entire visible spectrum, making the layer appear white, or part of it, making it have a colour. In examples described herein, the liquid of the first layer is black and therefore absorbs substantially all parts of the optical spectrum, for example in the visible light spectrum. Typically, substantially absorbs for example includes a degree of variation, therefore the liquid of the first layer may not absorb all wavelengths, but the majority of wavelengths within a given spectrum such as the visible spectrum, so as to perform the function of the first layer in the element. The liquid of the first layer may therefore be configured to absorb substantially all light incident on the first layer. For example the liquid of the first layer may absorb 90% or more of light in the visible spectrum and incident on the first layer.

The support plate 5 includes a layer with a surface for adjoinment by a liquid such as the liquid of the first layer described herein. In examples described herein, the layer is an insulating layer 13. The insulating layer may be transparent, for example fully transparent, for example transmissive. The insulating layer 13 may extend between walls of a display element. To avoid short circuits between the second layer of liquid 12 and electrodes arranged under the insulating layer, layers of the insulating layer may extend uninterrupted over a plurality of display elements 2, as shown in the Figure. The insulating layer has a surface 14 facing, for example closest to, the space 10 of the display element 2. The thickness of the insulating layer may be less than 2 micrometers and may be less than 1 micrometer.

The insulating layer in examples described herein is for example formed of a layer 15 which is for example formed of a hydrophobic material such as Teflon AF1600® and a barrier layer 16 with predetermined dielectric properties, the layer 15 facing, for example being closer to, the space 10, as shown in the Figure. The barrier layer 16 may have a thickness, taken in a direction perpendicular to the plane of the substrate, between 50 nanometers and 500 nanometers and may be made of an inorganic material like silicon oxide or silicon nitride.

In the absence of an applied voltage, for example with the applied voltage being a zero voltage, the liquid of the first layer 11 adheres preferentially to the surface of the insulating layer 13 for adjoinment by the first layer, since the surface for adjoinment by the first layer has a higher, for example greater, wettability for the liquid of the first layer than for the liquid of the second layer; the surface may therefore be hydrophobic. As will be explained, with the applied voltage being a non-zero voltage, the surface has a higher wettability for the liquid of the second layer than for the liquid of the first layer; for example the surface with the applied non-zero voltage may be considered to be hydrophilic. Wettability relates to the relative affinity of a liquid for the surface of a solid. Wettability may be measured by the contact angle between a boundary of the liquid and the surface of the solid. The contact angle is determined by the difference in surface tension between the liquid and the solid at the liquid-solid boundary. For example, a high difference in surface tension can indicate hydrophobic properties. As the skilled person will appreciate, a material may be considered to be hydrophobic if the contact angle with water is greater than 90 degrees; a material may therefore be considered to be hydrophilic if the contact angle with water is less than 90 degrees.

Each display element 2 includes a first electrode 17 as part of the support plate 5. In examples shown there is one such electrode 17 per element; in other examples there may be more than one electrode per display element. The electrode 17 is electrically insulated from the first and second layers by the insulating layer 13; electrodes of neighbouring display elements are separated by a nonconducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The support plate 6 for example includes a second electrode 19, which may extend between walls of a display element, or be located above or covering the walls of the display element or extend uninterruptedly over a plurality of display elements 2, as shown in the Figure. The electrode 19 is in electrical contact with the liquid of the second layer 12 and is common to all display elements. The electrodes 17 and 19 may be made of for example the transparent conductive material indium tin oxide (ITO). A second signal line 20 is connected to the electrode 19. Alternatively, the electrode may be arranged at a border of the support plates, where it is in electrical contact with the liquid of the second layer. This electrode may be common to all elements, when they are liquidly interconnected by and share the liquid of the second layer, uninterrupted by walls. The display element 2 can be controlled by a voltage V applied between the signal lines 18 and 20. The signal line 18 can be coupled to a matrix of control lines on the substrate 7a. The signal line 18 and 20 are coupled to a display driving system.

The liquid of the first layer 11 in this example is confined to a display element by at least one wall, in this example walls 21, that follow the cross-section of the display element. The cross-section of a display element may have any shape; when the display elements are arranged in a matrix form, the cross-section is usually square or rectangular. Although the walls are shown as structures protruding from the insulating layer 13 and formed on a surface of the insulating layer 13, they may instead be a surface layer of the support plate that repels the liquid of the first layer, such as a hydrophilic or less hydrophobic layer. The walls may extend from the first to the second support plate but may instead extend partly from the first support plate to the second support plate as shown in FIG. 1.

The extent of the display element, indicated by the dashed lines 3 and 4, is defined by the centre of the walls 21. The area of the surface between the walls of a display element, indicated by the dashed lines 22 and 23, is called the display area 24, over which a display effect occurs. The area of the surface on which the walls are formed may be referred to as the wall area. An extent of the surface 14 corresponding to the extent of the display area is in this example hydrophobic. The display effect depends on an extent that the liquids of the first and second layers adjoin the surface defined by the display area, in dependence on the magnitude of the applied voltage V described above. The magnitude of the applied voltage V therefore determines the configuration of the liquids of the first and second layers within the electrowetting element. In other words, the display effect depends on the configuration of the liquids of the first and second layers in the display element, which configuration depends on the magnitude of the voltage applied to the electrodes of the display element. The display effect gives rise to a display state of the display element for an observer looking at the display device. When switching the electrowetting element from one liquid configuration to a different liquid configuration the extent of the liquid of the second layer adjoining the display area surface may increase or decrease, with the extent of the liquid of the first layer adjoining the display area surface decreasing or increasing, respectively.

Figure 2:
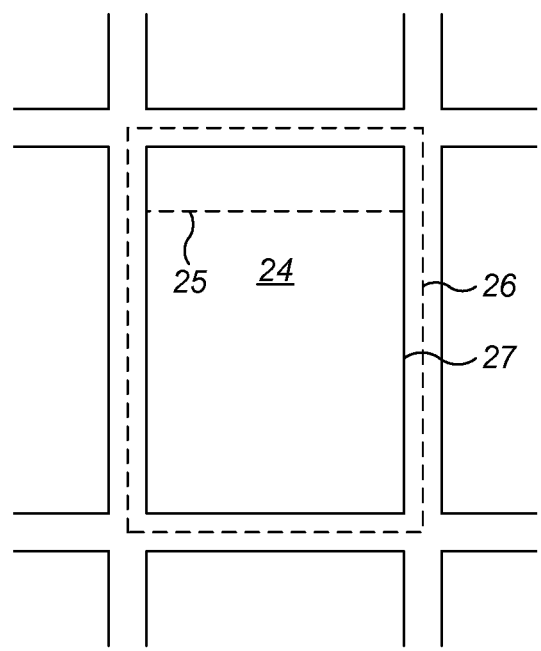
FIG. 2 shows schematically a plan view of the example of the electrowetting element.
Figure 3:
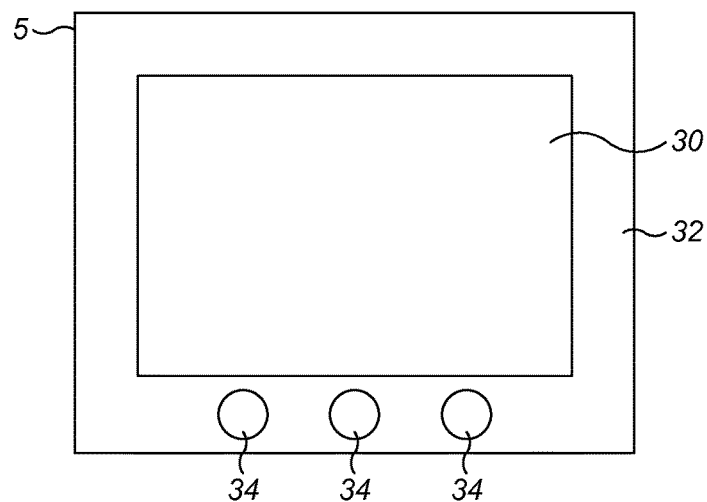
FIG. 3 shows schematically a plan view of an example support plate of a display device having an array of electrowetting elements.

FIG. 2 shows a matrix of rectangular picture elements in a plan view of the hydrophobic surface of the first support plate. The extent of the central picture element in FIG. 2, corresponding to the dashed lines 3 and 4 in FIG. 1, is indicated by the dashed line 26. Line 27 indicates the inner border of a wall; the line 27 is also the edge of the display area 24.

When a zero or substantially zero voltage is applied between the electrodes 17 and 19, for example when the electrowetting element is in an off state, the liquid of the first layer 11 forms a layer between the walls 21, as shown in FIG. 1. Application of a voltage will retract the liquid of the first layer, for example against a wall as shown by the dashed shape 25 in FIG. 1 or FIG. 2. The controllable shape of the liquid of the first layer, in dependence on the magnitude of applied voltage, is used to operate the picture element as a light valve, providing a display effect over the display area 24. For example, switching the liquids of the first and second layers to increase adjoinment of the liquid of the second layer with the display area may increase the brightness of the display effect provided by the element. This display effect determines the display state an observer will see when looking towards the viewing side of the display device. The display state can be from black to white with any intermediate grey state; in a colour display device, the display state may also include colour.

As partly illustrated in FIG. 2, the picture elements, in other words the electrowetting elements, may be arranged in a matrix layout. This is an example of arranging the electrowetting elements in an array. Referring now to FIG. 3, FIG. 3 shows in plan view the first support plate 5 though in further examples it may represent a surface of a different support plate of a display device. The support plate has a first region 30 which corresponds to an area of the surface within which the array of electrowetting elements is located. Outside of the first region is a second region 32 which may for example be a region of the support plate for mounting electronic components for controlling a voltage applied to the electrowetting elements. The second region may form a border region around the first region. A surface of the support plate in the second region has at least one area 34 with a first surface energy and a different area within the second region and surrounding the at least one area 34 with a second surface energy different from the first surface energy. The second surface energy may be substantially equal to a surface energy of a surface of a part of the support plate of one of the electrowetting elements, for example the surface labelled 14 in FIG. 1. The at least one area 34 may be substantially circular. The at least one area 34 may correspond to an area contacted by a first liquid during determining, which in some examples is otherwise referred to as measuring, a contact angle as described in further detail below, and for example having the area with boundary 94 as shown in FIGS. 7*aviii* and 7*bviii* below. Indeed, the presence of such an area 34 outside of the first region would indicate use of the method of measuring a contact angle and therefore of controlling at least one surface treatment control parameter, for example changing at least one parameter value of such at least one parameter, in accordance with examples of the methods described below. In some examples a liquid for example a droplet may be present on the at least one area 34, for example as illustrated in FIG. 7*aviii* below. Further, a size of at least one of the areas 34 may be greater than a size of an area of the surface 14 within one of the electrowetting elements. For example, the area 34 may have an area of 1 to 15 millimeters squared, for example 10×10 millimeters. This is notably larger than the display area of an electrowetting element which is for example 20×20 micrometers.

Figure 4:
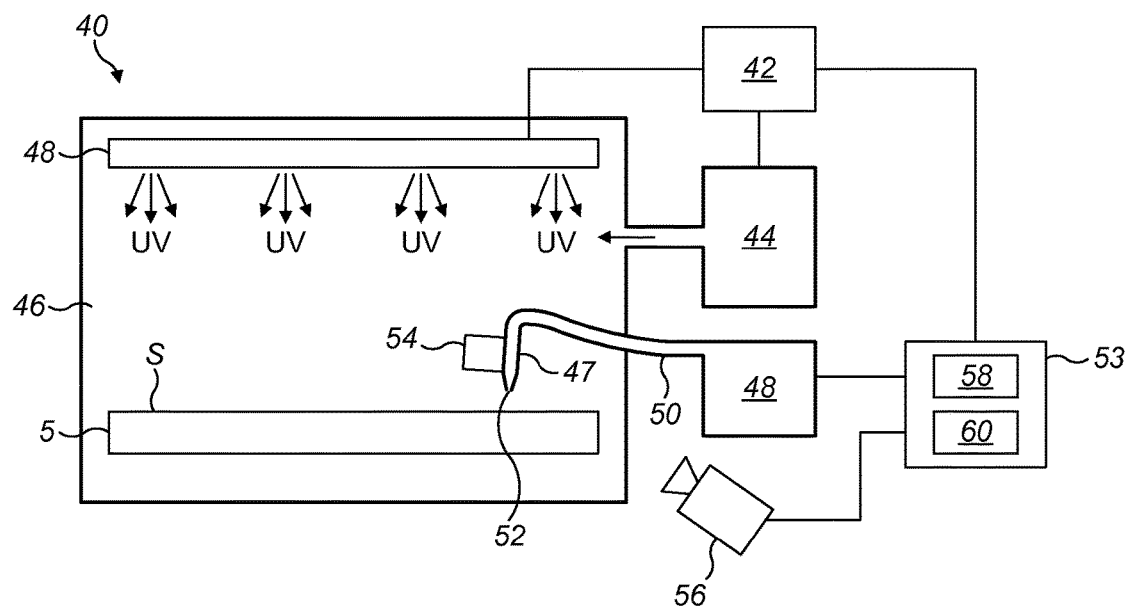
FIG. 4 shows schematically example apparatus for controlling treatment of a surface.

FIG. 4 shows schematically an example of apparatus 40 for performing a treatment of a surface, including apparatus for controlling the treatment of the surface.

The apparatus for controlling the treatment of the surface may be supplied separately from the apparatus for performing the treatment of the surface (which may otherwise be referred to as surface treatment apparatus). For example, the apparatus for controlling the treatment of the surface, specifically an output of at least one processor, may be connected to an input of a control system, for example at least one processor, of the apparatus for performing the treatment of the surface. In this way, the apparatus for controlling the treatment of the surface may be used with existing apparatus for treating a surface without major redesigning or reconfiguration of the apparatus. In other examples the apparatus for controlling the treatment of the surface may be part of the surface treatment apparatus.

Referring to FIG. 4, the apparatus in this example for treating the surface is for applying an ultraviolet (UV) ozone ($O_3$) treatment to the surface. For example, as the skilled person will readily appreciate, a UV ozone treatment may be used to clear organic contaminants from a surface. In the context of manufacturing an electrowetting element, a UV ozone treatment may be used to increase a hydrophilicity of a surface of the first support plate, before then increasing the hydrophobicity of the surface to a required hydrophobicity for the display areas.

The apparatus in this example for applying a UV ozone treatment includes a control system 42, a gas control system 44, a chamber 46, a UV radiation emitter 48, and a structure (not shown) for holding the object with the surface to be treated. For example, the structure may be a holder or platform, on which the object such as the support plate (5 as shown in FIG. 4) with the surface for treatment may be placed. Fixings, such as clips or fasteners may be provided to hold the object in place during the treatment.

As the skilled person will appreciate, a UV ozone treatment involves for example inputting oxygen and/or air (by for example the gas control system 44 which controls at least one of an input gas flow rate, input gas concentration, waste gas concentration, or input gas composition) into a chamber in which the surface to be treated is placed. Upon exposure of the oxygen (which may be in the inputted air) to ultraviolet light of a suitable wavelength, atomic oxygen and ozone may be formed, which may then react with contaminants on the surface to be treated.

Often, it is desired to treat a surface until a desired surface energy of the surface is obtained. For example, during manufacture of an electrowetting element, the surface of the support plate may be desired to be cleaned to a desired hydophilicity before then being further treated for example to increase its hydrophobicity.

It is however difficult to monitor progress of treatment of a surface. A known method includes periodically stopping treatment of a surface such that a surface energy of the surface may be tested periodically. As the surface energy approaches the desired surface energy, it may be necessary to more regularly stop the treatment and test the surface energy of the surface, to ensure that the treatment does not overtreat the surface, in other words that the treatment does not overshoot the desired surface energy.

As will be appreciated, such periodic stopping of the treatment is inefficient and cumbersome, particularly given the start-up and shut down time and processes for the surface treatment apparatus each time a surface energy test is done.

A method according to examples described later overcomes these problems in that a surface energy may be monitored whilst the treatment of the surface is performed. In other words, changing of the surface energy of the surface may be monitored in situ as the surface is treated. This obviates the need to shut down and start-up the surface treatment apparatus each time the surface energy is to be tested. Moreover, as the surface energy can be determined, for example measured, as the surface treatment is performed, values of parameters for controlling the surface treatment may be controlled, for example changed, in dependence on the determined surface energy of the surface, for example to increase or decrease a rate of the treatment, or to change for example a composition of the gas that is inputted into the chamber or a frequency or intensity of the UV radiation.

In examples, for example that of FIG. 4, the apparatus for controlling the treatment of the surface comprises a dispensing system which for example comprises a dispenser 47 and a liquid reservoir 48 of an appropriate size and which is for example fluidly connected by for example a conduit 50 to the dispenser. The dispenser is for example a needle, tube, pipe or other form of conduit having an opening 52 through which liquid held in the liquid reservoir may be dispensed, having been conveyed from the liquid reservoir to the dispenser via the conduit 50. The dispenser is positioned such that the opening 52 is the part of the dispenser closest to the surface to be treated, such that a liquid dispensed through the opening may be then applied unimpeded to the underlying surface as will be explained further below. The dispensing system may include a pump (not shown) for pumping liquid from the liquid reservoir to the dispenser. The pump may be controllable to control a flow rate of the liquid to the dispenser, or alternatively or additionally a valve (not shown) may be used for controlling a flow rate of the liquid from the liquid reservoir to the dispenser. The dispensing system, for example the pump, is electrically connected to a control system 53 for controlling the treatment of the surface by for example outputting at least one signal to for example an input of the control system (such as the control system 42) of the apparatus for treating the surface, for controlling, for example changing a parameter value of at least one surface treatment control parameter in dependence on the first contact angle.

The apparatus for controlling the treatment of the surface may in examples further comprise a dispenser actuation system 54 configured to move a position of the dispenser 47. For example, the actuation system 54 may be configured to move the dispenser in any dimension, for example laterally over the surface to be treated in an x or perpendicular y axis, and/or away from or towards the surface to be treated, for example along a perpendicular z axis, as the skilled person will understand. In this way, the opening of the dispenser may be positioned as desired for the method of controlling the treatment. The dispenser actuation system 54 is for example electrically connected to the control system of the apparatus, for example the control system 53, for controlling the treatment of the surface such that the position of the dispenser can be controlled by the control system.

In examples the apparatus for controlling the treatment of the surface further comprises image capture apparatus, which is for example a camera 56, for example a camera for recording still images or video. It is to be appreciated that video is a series of still images and therefore the camera may be configured to record video with a required frame rate for determining, for example measuring, a contact angle as explained below. The camera is electrically connected to the control system for the treatment of the surface, for example the control system 53. A camera actuation system (not shown) may in some examples be provided to move a position of the camera, so that the camera can record any required image for the method, for example to monitor dispensing or sucking of liquid out from or into the opening of the dispenser in order to monitor progress of the method, and/or for determining, for example measuring, a contact angle between an edge of the meniscus of a liquid on the surface as will be explained later.

The control system of the apparatus for controlling the treatment of the surface may include at least one processor 58 and at least one memory 60 including computer program instructions, for example computer software, the at least one memory and the computer program instructions being configured to control a method of treatment of the surface, for example a method according to examples described below. The computer program instructions may therefore include computer program instructions for any of: controlling movement of the dispenser using the dispenser actuation system, dispensing of a liquid from the dispenser including a flow rate for example, recording at least one image using the camera, analysing at least one image recorded by the camera for example to measure a contact angle between an edge of a meniscus of a liquid and the surface being treated, calculate a surface energy based on a measured contact angle, output a signal to the control system of the apparatus providing the treatment such as the control system 42 to determine at least one second parameter value of respectively at least one surface treatment control parameter based on a determined contact angle and/or a calculated surface energy of the surface being treated and then to change at least one surface treatment control parameter from at least one first parameter value to respectively the at least one second parameter value of the respective at least one surface treatment control parameters. It is to be appreciated that this is not an exhaustive list and therefore any process, method or part of such a process or method for controlling the treatment of the surface described herein may be controlled by the control system of the apparatus for controlling the surface treatment, for example by the control system 53, in accordance with appropriate computer program instructions stored in the at least one memory. Further, it is to be appreciated that the at least one processor may be connected for data communication with at least one of the dispensing system, the dispenser actuation system or the camera, for example.

Figure 5A:
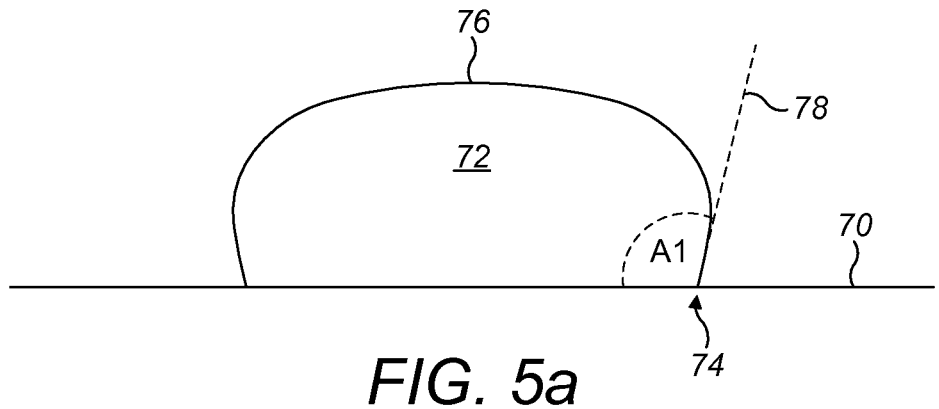
FIGS. 5a, 5b and 5c show schematically different examples of a contact angle.
Figure 5B:
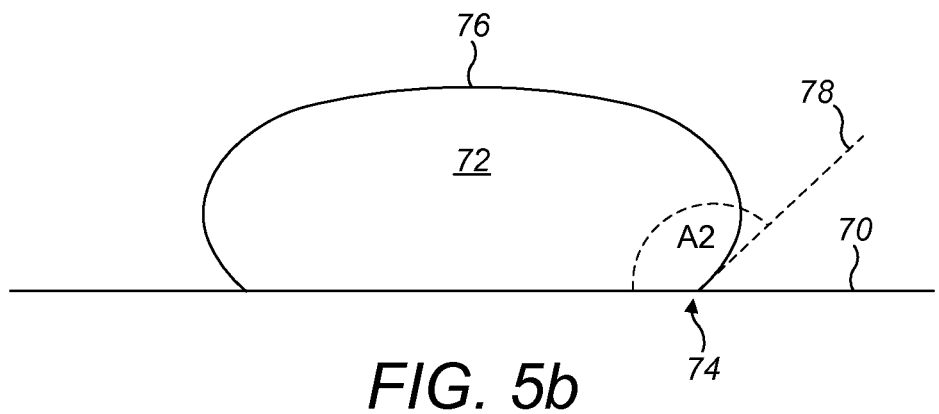
Figure 5C:
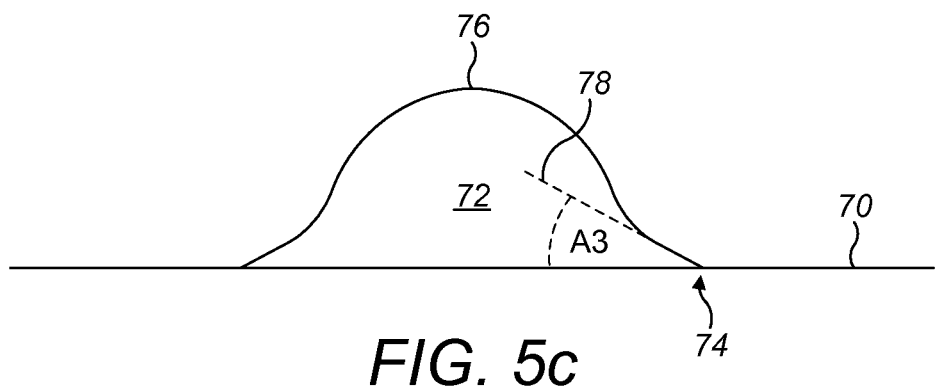

Referring to FIGS. 5a, 5b, 5c an explanation of a contact angle, including an advancing contact angle and a receding contact angle will be given, before then describing examples of a method of controlling treatment of a surface.

FIG. 5a shows a surface 70 with a volume of a liquid 72 on an area of the surface. As is known, any surface has a surface energy which is typically a measure of energy of a surface, for example due to disruption of atomic bonds at the surface which otherwise would be present between atoms within a bulk of the material having the surface. For example, as atomic bonds within the bulk of a material are often more stable and lower in energy than disrupted atomic bonds at a surface of a material, the surface compared with the bulk may have a higher excess energy compared with interatomic bonds within a bulk of a material. Different surfaces may have a different surface energy compared with each other. The specific surface energy of a surface for example depends on an atomic composition and/or geometry between atoms of the material forming the surface. A surface may be treated to change the atomic composition and/or atomic geometry for example using physical or chemical treatments, in order therefore to change a surface energy of a surface.

When a material interacts with, for example contacts, another material, the interaction may for example depend on the surface energy of a surface of each of the materials. When a liquid contacts a surface of a solid, the liquid typically will wet the surface of the solid to a lesser or greater extent. This extent of wetting depends on the surface energy of the liquid and the surface energy of the solid. Where a liquid is placed on a solid surface the liquid may adopt a curved shape on the surface, with the rate or curvature of a surface of the liquid depending on a volume of the liquid and the surface energy of the liquid compared with the surface energy of the solid. The surface of the liquid may be referred to as a meniscus, which typically corresponds with a boundary or interface between the liquid and another material such as in the example shown in FIGS. 5a to 5c a gas for example air. The curvature of the meniscus typically depends on the extent of wetting of the solid by the liquid. The extent of the wetting of the solid by the liquid typically depends on a contact angle where an edge of the meniscus contacts, for example adjoins, the surface of the solid. In other words, where the meniscus meets or contacts the solid, the meniscus forms an angle of contact, for example a contact angle, with the surface. The position on the surface where the meniscus contacts the surface may for example be a point between three phases, for example where the liquid, solid and gas meet.

FIG. 5a shows a position 74 on the surface 70 where a meniscus 76 contacts the surface of the solid. Dashed line 78 represents a tangent of the curvature of the meniscus at the position of contact by the meniscus on the surface 70. The contact angle A1 is indicated by the dashed angle between the tangent 78 and the surface of the solid (for example a plane of the surface where the surface is planar or substantially planar for example planar within acceptable surface irregularity tolerances).

A contact angle indicates for example an affinity of a liquid to wet a solid, which is for example indicative of a wettability of a solid for a liquid. However, changes in the volume of the liquid for example, and/or movement of a volume of liquid across the surface, may change a contact angle between the edge of the meniscus and the surface. Therefore, it may in some circumstances be appropriate to determine, for example measure, more than one type of contact angle between an edge of a liquid meniscus and a surface. For example, if a surface energy of a surface is to be calculated from a determined contact angle, in some examples it may be appropriate to determine at least one of an advancing contact angle and a receding contact angle. For example, a surface energy may be calculated using an equilibrium contact angle, the equilibrium contact angle being calculated from a measured advancing contact angle and a receding contact angle.

FIG. 5b will now be used to explain an advancing contact angle. Compared with FIG. 5a, the contact angle A2 between the surface 70 and the edge of the meniscus of the liquid is greater than the contact angle A1 of FIG. 5a. In the example of FIG. 5b, the volume of the liquid 72 has been increased by for example dispensing more of the liquid into the volume of the liquid 72. In doing so, the area of the surface contacted by the liquid 72 has increased, for example enlarged, which advances the edge of the meniscus in contact with the surface across the surface. The difference in surface energy between the liquid and the surface energy of the solid determines how readily the edge of the meniscus will advance across the surface. The greater the difference between the two surface energies, the less readily the edge of the meniscus will advance across the surface, given the relatively lower wettability of the surface for the liquid compared with the case where the difference between the two surface energies is less. In order for the edge of the meniscus to advance across the surface, the difference between the surface energy of the surface and the liquid needs to be overcome. This may happen if the volume of the liquid is sufficiently increased such that the mass of the liquid is sufficient to push the edge of the meniscus outwards across the surface, thereby advancing the position of contact between the surface and the meniscus. Alternatively, the volume of the liquid may remain constant but the volume may be translated using an appropriate technique, the translation occurring when the energy for translating the volume of the liquid exceeds the difference between the surface energy of the surface and the liquid. Such advancing may otherwise be considered to be an outwards progression or moving across the surface to enlarge the contact area of the liquid on the surface.

As the meniscus edge advances across the surface, the edge of the meniscus in contact with the surface may be considered to have a substantially maximum contact angle. As this contact angle corresponds to the edge of the meniscus advancing across the surface, the contact angle may for example be referred to as an advancing contact angle. Therefore, a maximum advancing contact angle is for example an advancing contact angle between the surface and the edge of the meniscus which cannot be increased further due to the restraint of increasing the angle caused by the difference in surface energies of the surface and the liquid. In other words, the maximum advancing contact angle may for example be taken to correspond with the maximum limit of contact angle for a given difference between the surface energy between the surface and the liquid. Typically the maximum advancing contact angle may be considered a substantially maximum advancing contact angle, for example with substantially indicating a range of variation of the maximum advancing contact angle due to for example any of: acceptable irregularities in the surface energy of the surface at different locations, acceptable irregularities in the shape of the surface and acceptable measurement accuracy variations. To reach the maximum advancing contact angle, the volume of the liquid for example needs to be increased at a sufficiently high rate, or in some examples the volume of the liquid needs to be translated across the surface at a sufficiently high rate of translation, to maintain the edge of the meniscus advancing across the surface.

FIG. 5c will now be used to explain a receding contact angle. Compared with FIG. 5a, the contact angle A3 between the surface 70 and the edge of the meniscus of the liquid is less than the contact angle A1 of FIG. 5a and is therefore also less than the contact angle A2 of FIG. 5b. In the example of FIG. 5c the volume of the liquid has been decreased compared with the volume of the liquid of FIG. 5a. In doing so the area of the surface contacted by the liquid 72 has decreased, for example reduced, which recedes the edge of the meniscus across the surface. Similar as explained above for the advancing contact angle, the difference in surface energy between the liquid and the surface determines how readily the edge of the meniscus will recede across the surface. Receding may otherwise be considered to be a retraction, contraction, inwards progression or moving across the surface to reduce the contact area of the liquid on the surface. Such receding will occur for example if the volume of the liquid is sufficiently reduced such that the surface tension between atoms and/or molecules of the liquid is sufficiently high to pull the edge of the meniscus inwards across the surface as the volume is reduced, thereby receding the position of contact between the surface and the meniscus. Alternatively, the volume of the liquid may remain constant but the volume may be translated in an opposite direction as the direction for the translation described above for the advancing contact angle, with the surface tension of the liquid being sufficiently high to pull the meniscus edge across the surface.

As the meniscus edge advances across the surface, the edge of the meniscus in contact with the surface may be considered to have a substantially minimum contact angle. As this contact angle corresponds to the edge of the meniscus receding across the surface, the contact angle may for example be referred to as a receding contact angle. Therefore a maximum receding contact angle is for example a receding contact angle between the surface and the edge of the meniscus which cannot be reduced further due to the restraint of reducing the angle caused by the difference in surface energies of the surface and the liquid. In other words the maximum receding contact angle may for example be taken to correspond with the minimum limit of contact angle for a given difference between the surface energy between the surface and the liquid. Typically the maximum receding contact angle may be considered a substantially maximum receding contact angle, for example with substantially indicating a range of variation of the maximum receding contact angle due to for example similar reasons as given above for the substantially maximum advancing contact angle, for example any of: acceptable irregularities in the surface energy of the surface at different locations, acceptable irregularities in the shape of the surface and acceptable measurement accuracy variations. To reach the maximum receding contact angle, the volume of the liquid for example in some examples needs to be reduced at a sufficiently high rate, or in some examples the volume of the liquid needs to be translated across the surface at a sufficiently high rate of translation, to maintain the edge of the meniscus receding across the surface.

Once an advancing contact angle and a receding contact angle have been determined for a liquid on a surface, for example a substantially maximum or a maximum advancing contact angle and a substantially maximum or a maximum receding contact angle, an equilibrium contact angle may be calculated for the liquid on the surface. As will be appreciated from FIGS. 5a to 5c, the variation in the contact angle in dependence on whether the edge of the meniscus is advancing or receding across the surface reflects a hysteresis in the contact angle in dependence on motion of the edge of the meniscus over the surface. By calculating an equilibrium contact angle using the advancing contact angle and the receding contact angle, it is therefore possible to calculate a contact angle value which takes into account the hysteresis.

The surface energy of the surface may then be calculated using the equilibrium contact angle $\theta_{eq}$.

For example, the equilibrium contact angle may be calculated using the Tadmor equation which the skilled person will be familiar with. The Tadmor equation is for example given in formula (1):

$$\theta_{eq} = \arccos\left(\frac{\Gamma_A \cos\theta_A + \Gamma_R \cos\theta_R}{\Gamma_A + \Gamma_R}\right) \quad (1)$$

where, with $\theta_A$ being the advancing contact angle, $\Gamma_A$ may be calculated according to formula (2)

$$\Gamma_A = \left(\frac{\sin^3\theta_A}{(2 - 3\cos\theta_A + \cos^3\theta_A)}\right)^{1/3} \quad (2)$$

where, with $\theta_R$ being the receding contact angle, $\Gamma_R$ may be calculated according to formula (3)

$$\Gamma_R = \left(\frac{\sin^3\theta_R}{(2 - 3\cos\theta_R + \cos^3\theta_R)}\right)^{1/3}. \quad (3)$$

The surface energy of the surface may then be calculated using the calculated equilibrium contact angle $\theta_{eq}$, for example using the following formula (4).

$$\cos\theta_{eq} = \frac{\gamma_{SV} - \gamma_{SL}}{\gamma_{LV}} \quad (4)$$

$\gamma_{SL}$ in formula (4) may be approximated using:

$$\gamma_{SL} = [\gamma_{SV} - \gamma_{LV}]^\rho + \left[1 + -\exp\left(C\frac{\gamma_{SV}^\beta}{\gamma_{LV}^\beta}\right)\right] + A\gamma_{LV}\exp[B\gamma_{SV}^\alpha \gamma_{LV}^\beta] \quad (5)$$

where each of $\rho$, $\alpha$ and $\beta$ is a number independently selected from the range −5 to 5, and where each of A, B and C is a number independently selected from the range −100 to 100. Each of $\rho$, $\alpha$ and $\beta$ and A, B and C may be an experimentally determined coefficient to tune the formula (5) for more accurately calculating the surface energy of the surface. Therefore, with appropriate selection of the value of each coefficient, the formula (5) may be better fitted for the actual conditions during the method of treatment, for example in dependence on the specific treatment environment used and the chemical composition of the first liquid. In one example, $\rho$ may be 1, C may be 0, $\alpha=-\beta$, A=2 and B=A.

$\gamma_{SV}$, $\gamma_{SL}$ and $\gamma_{LV}$ are respectively: a surface energy (which may otherwise be considered an interfacial energy) of a surface of a solid (S) phase in contact with a vapour (V) phase (for example a gas surrounding the liquid on the surface); a surface energy of a surface of the solid (S) phase in contact with the liquid (L) phase; and a surface energy (which may otherwise be considered a surface tension) of a surface of the liquid (L) phase in contact with the vapour (V) phase.

$\gamma_{LV}$ may be calculated using a known method, for example using the Bashforth and Adams equation as described further below. By substituting the expression for $\gamma_{SL}$ from formula (5) into formula (4), $\gamma_{SV}$ may be calculated. Then, the calculated value of $\gamma_{SV}$ may be substituted into formula (5) to calculate $\gamma_{SL}$. Therefore, for example, using a known or calculated value of the surface energy ($\gamma_{LV}$) of the liquid surface in contact with the vapour, it is possible to calculate the surface energy of the solid surface in contact with the vapour, for example $\gamma_{SV}$, and the surface energy for the surface of the solid in contact with the liquid, for example $\gamma_{SL}$.

Figure 6:
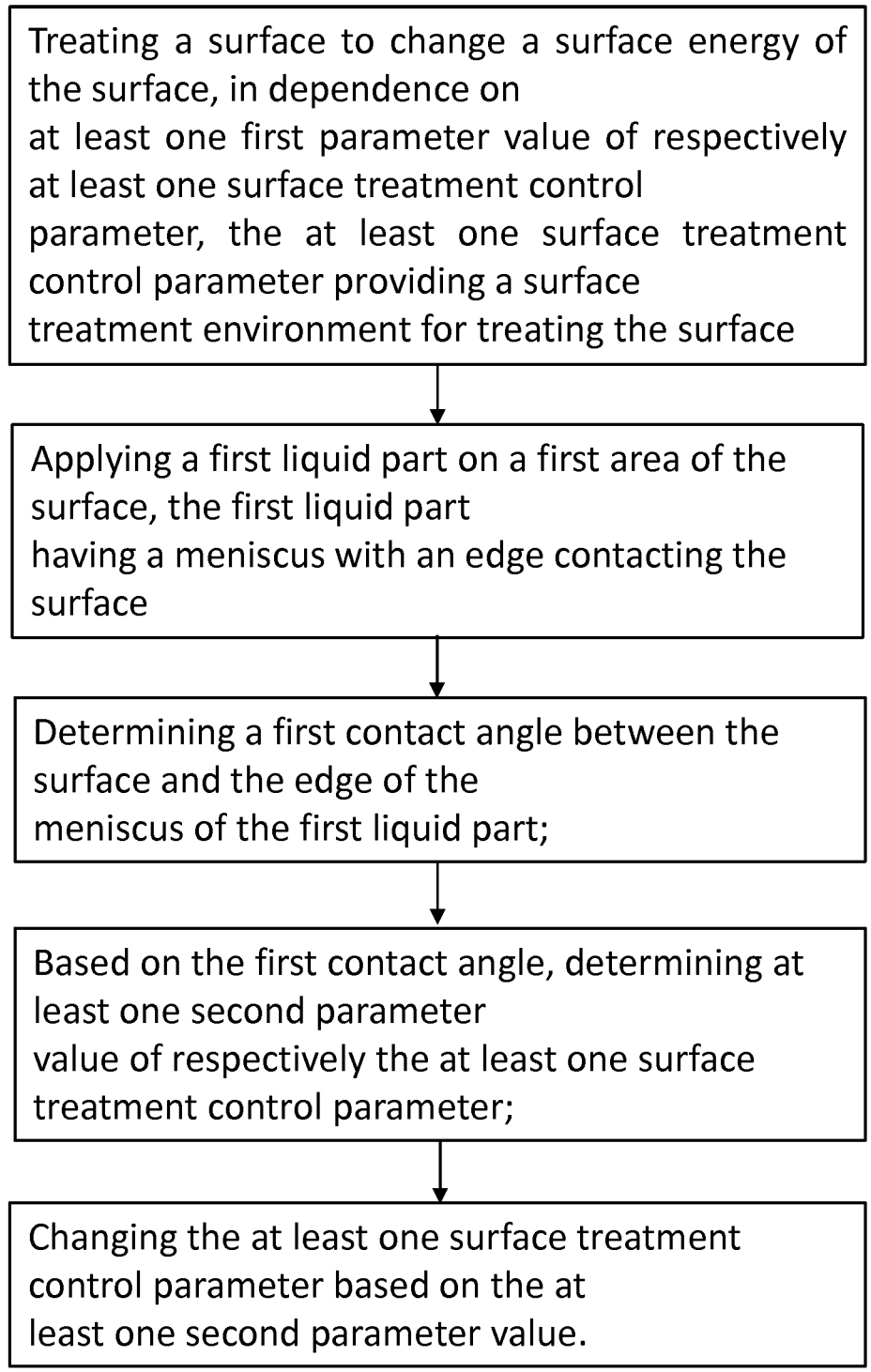
FIG. 6 is a flow diagram of a method of controlling treatment of a surface according to examples.

FIG. 6 illustrates a method of controlling a treatment of a surface according to examples such as those described below using FIGS. 7ai to 7aviii and 7bi to 7bviii.

The examples of a method of controlling a treatment of a surface will now be described with respect to FIGS. 7*ai* to 7*aviii* and 7*bi* to 7*bviii* which describe the method in the context of treating a surface of a support plate during manufacture of an electrowetting display device using the example of apparatus described in FIG. 4. It is to be appreciated however that in alternative examples the method may be applied to a different surface and that different apparatus may be used. Therefore, features of the surface and the apparatus described in the examples now to be described should not be taken to be limiting for all examples of the method of controlling treatment of the surface within the scope of the appended claims.

FIGS. 7*ai* to 7*aviii* show in cross section a support plate 80 having a surface 82 being treated, for example using the UV ozone treatment described above, though in alternative examples a different treatment may be being applied to the surface. The treatment is for example to change a surface energy of the surface, or in other examples a measure of a contact angle of a liquid on the surface or a measure of the surface energy of the surface may be used to indicate progress of a treatment of the surface.

The support plate 80 may for example be a partially manufactured support plate for an electrowetting element, which when fully manufactured for example may be the first support plate 5 described above. During manufacture of such a support plate, a UV ozone treatment may be used to clean the surface of organic contaminants. It is to be understood that the method of examples described herein may be applied to other methods of treating a surface, for example to change the surface energy of the surface. Such methods may be performed in a non-vacuum environment, so that the method of examples described herein may be satisfactorily performed.

For each of FIGS. 7*ai* to 7*aviii* and corresponding FIGS. 7*bi* to 7*bviii* it is to be understood that the surface is being treated, in this example by the UV ozone treatment described above.

In this and other examples, the treating the surface may be performed in accordance with surface treatment control parameters, by controlling, for example changing, parameter values of these parameters. For example, for the UV ozone treatment, and for other examples of surface treatment methods, such surface treatment control parameters may include at least one of: a flow rate of a treatment gas into a chamber in which the treating the surface is performed; a concentration of a treatment gas in a chamber in which the treating the surface is performed; a composition of a mixture of treatment gases in a chamber in which the treating the surface is performed; a temperature of an environment in which the treating the surface is performed; a pressure of an environment in which the treating the surface is performed; an intensity of radiation applied to the surface during the treating the surface; a frequency of radiation applied to the surface during the treating the surface; or a power of radiation applied to the surface during the treating the surface.

FIG. 7*ai* shows a volume of a first liquid being dispensed from the dispenser 47 using the dispensing system described previously and therefore having been stored in the liquid reservoir. In this example the volume is a droplet 84 of first liquid. The volume of the droplet dispensed on the surface may depend on the system used for determining a contact angle. For example, the droplet may have a volume of 2 to 10 microliters, though in other examples the droplet may have a lower volume, for example less than 2 microliters and down to for example 100 picoliters. A droplet is for example a body of liquid, for example of liquid, having a surface with an at least partly curved profile. A droplet may when suspended in a gas, for example as shown in FIG. 7*ai* as hanging or pending from the opening of the dispenser 47, have an at least partly tear drop or pear shape, for example with a wider lower portion than an upper portion, which upper portion may be tapered towards the opening of the dispenser. A droplet may when applied on a surface have a self-contained volume, for example the droplet does not form a uniform thickness layer across the surface, but instead has an at least partly curved profile, for example cross-section. The form of the curvature of the profile depends for example on the shape of the meniscus of the liquid which in turn may depend on a contact angle of an edge of the meniscus with the surface (due to for example a difference in surface energies between the liquid and the surface) and for example on a surface tension of the liquid. If a droplet is applied to a surface but is still in contact with the dispenser opening the droplet may for example taper towards the dispenser.

The first liquid comprises a material selected for an appropriate degree of wetting of the surface so that the method of determining, for example measuring, the contact angle may be performed. For example, for a hydrophobic surface or a hydrophilic surface, the first liquid may comprise water and may for example be substantially water, for example water with acceptable amounts of impurities for the method. Other liquids may be used in examples which enable the method of determining the contact angle of the liquid on the surface to be properly done. So, the liquid may be selected on the basis of a difference between the surface energy of the surface and the surface tension of the liquid, so there is a sufficiently large energy difference between the surface energy of the surface and the surface tension of the liquid that the contact angle may be determined with a required level of accuracy.

Referring to FIG. 7*ai*, the dispensing of the first liquid is monitored using at least one image recorded using the camera 56, so that a size and/or volume of the droplet of the first liquid is controlled. In other examples the dispensing system may be calibrated to dispense a predetermined volume of the first liquid to dispense a droplet of a desired size and/or volume.

In the example being described, a surface tension of the first liquid dispensed by the dispenser may be determined, for example measured, before the first liquid is applied to the surface 82. This may for example be performed by dispensing the first liquid from the dispenser until a desired volume and/or size of a droplet of the first liquid is obtained. Then the dispensing of the first liquid may be stopped before the volume/size of the droplet is too great such that the droplet detaches from the dispenser and falls to the surface. Then the first liquid is sucked back into the dispenser, using for example a vacuum pump in the dispensing system. The growth and then shrinking in size of the droplet is recorded with images using the camera. By analysis of the images using the control system 53 and with a known volume of the first liquid in the droplet due to accurate dispensing and sucking of the first liquid of the dispensing system, a surface tension of the first liquid may be calculated.

An example of a calculation of the surface tension of the first liquid in the droplet is known by the skilled person. The surface tension of the first liquid corresponds to the forces of the liquid at its surface to maintain cohesion to remain as a droplet. The surface tension may therefore be considered a force that prevents another medium from disrupting the surface of the droplet. To measure the surface tension, the impact of gravity and environmental pressure on the shape of the first liquid droplet may be evaluated. The basis of such an evaluation may be the Laplace pressure equation which the skilled person is familiar with. For example, the Bashforth and Adams equation which the skilled person is familiar with may be used to calculate the surface tension of the droplet of the first liquid.

This calculated surface tension of the first liquid before being applied to the surface may be used in calculating a surface energy of the surface later in the method, more specifically for example to calculate $\gamma_{LV}$. Hence, the calculating of the surface tension of the first liquid may be considered to be a calibration step for improving accuracy of the determination, for example measurement, of the contact angle and/or the surface energy of the surface later in the method. In some examples, the surface tension of the first liquid may be determined, for example measured, at least one more time, during or after the method described in examples of determining the contact angle. So, for example, after advancing the first liquid and determining the advancing angle, as described below, the first liquid may be sucked from the surface using the dispenser and the surface tension of the first liquid measured again using the method described above. The first liquid may then be reapplied to the surface so that a receding contact angle may be determined as described below. Further, or alternatively, the surface tension of the first liquid may be determined again after completion of the determining of the contact angle (for example using the advancing and receding based method described below), again for example by sucking the first liquid from the surface using the dispenser and using the method described above.

FIG. 7bi shows in plan view the surface 82. So far, as the first liquid is not yet applied to the surface 82, there is no edge of a meniscus of the first liquid in contact with the surface 82.

Next, as illustrated using FIG. 7aii, a part of the first liquid is applied on a first area of the surface 82, to bring the first liquid into contact with the first area. This is done by for example using the dispenser actuation system to move a position of the dispenser. For example the opening of the dispenser 52 is moved towards the surface 82 until the droplet hanging from the opening of the dispenser contacts the surface 82. Further, the opening of the dispenser 52 may be moved laterally to position the droplet over a desired area of the surface on which the part of the first liquid is to be applied. This may be a region of the surface outside a region in which an array of electrowetting elements will be formed, as will be understood from the description of FIG. 3 above. The extent of the movement is controlled for example using accurate controlling of the dispenser actuation system. Feedback on movement of the dispenser for more accurate control of the movement may be obtained using images recorded using the camera to monitor the movement of the dispenser. The distance between the opening of the dispenser and the surface is controlled so that for example a desired size of a first area of the surface is contacted by the first liquid. It is noted that if the calibration described above is performed it may be necessary to dispense further of the first liquid from the dispenser after sucking in the first liquid in order to form a droplet of a desired volume and/or size for then applying to the surface.

FIG. 7bii illustrates the first area 86. The first liquid when now applied on the surface forms for example a droplet 85, a boundary of the first area corresponding with a position on the surface where the edge of the meniscus of the first liquid contacts the surface. The droplet 85 of the first liquid remains in contact with the opening of the dispenser, due to appropriate setting of the distance between the opening of the dispenser and the surface and appropriate control of the volume of the first liquid in the droplet. Once the part of the first liquid has been applied to the first area, the first liquid may be vibrated using the dispenser actuation system to centre the first liquid on the surface and may be to improve a contact between the first liquid and the first area of the surface.

A first contact angle between the surface and the edge of the meniscus of the first liquid may then be determined or measured.

In examples described here, a contact angle between the surface and the edge of the meniscus of the liquid is determined, for example measured, by recording at least one image using the camera of the droplet on the surface. With the liquid being sufficiently transparent and the focus and/or magnification setting of the camera appropriately set, a profile of the droplet on the surface may be imaged and recorded in at least one image. In some examples, a camera focus may be set to image a profile in a plane passing through a centre of the droplet, or approximately through the centre of the droplet, where the cross-sectional size of the droplet may be largest.

When determining, for example measuring, a contact angle using such an image of a cross-section, it is to be appreciated that two contact angles may be seen; one contact angle to a left hand side of the cross section and one contact angle to a right hand side of the cross section. In the examples described here the description and drawings will refer to the right hand side such contact angle as being measured, though in further examples it is to be appreciated that the left hand side such contact angle may instead be measured, or that in further examples that both such contact angles may be measured and for example an average value calculated where appropriate to give a more accurate measurement of the contact angle.

An image showing the edge of the meniscus contacting the surface may be analysed for example using appropriate image analysis software. For example, such software is available from Krüss GmbH (Borsteler Chaussee 85, 22453 Hamburg, Germany) which may be used in conjunction with equipment such as Krüss GmbH's MSA equipment. The skilled person will appreciate that this is one such example, and that numerous alternative software examples may be used for imaging contact of a liquid with a surface to determine a contact angle.

In some examples, the first contact angle may be the contact angle for the droplet 85 after having been applied on to the surface 82. In such an example the first contact angle may be considered to be a measured static contact angle as the measurement is taken without moving the edge of the meniscus across the surface.

In other examples, including those now described using FIGS. 7aiii to 7aviii, it may be considered that a dynamic contact angle is measured, as will now be explained.

In examples, after the applying the part of the first liquid on the first area of the surface, the edge of the meniscus of the first liquid is advanced from a first position on the surface to an advanced position on the surface by dispensing first liquid on the surface, for example to increase the volume of the first liquid on the surface. Looking at the cross section of the first liquid on the surface, a position is a point or a location on the surface at which the meniscus edge of the first liquid contacts or adjoins the surface. In this example the right hand side position is considered but it to be appreciated that in cross section the meniscus may also contact a left hand side position on the surface.

The first position corresponds with a position of the edge of the meniscus on the boundary of the first area 86, in other words the area of the surface contacted by the first liquid when applied to the surface. Then, by, in this example, using the dispensing system to dispense more of the first liquid, the volume of the first liquid on the surface increases to the extent that the edge of the meniscus advances across the surface, thereby increasing the size of an area of the surface contacted by the first liquid. The flow rate of dispensing the further of the first liquid is sufficiently high for the contact angle to change to become an advancing contact angle and then the substantially maximum contact angle as described earlier. Thus, during the advancing of the edge of the meniscus across the surface from the first position to the second position more of the first liquid is dispensed to increase the size of the area contacted by the first area.

The first contact angle measured in examples is an advancing contact angle, and in these examples is the substantially maximum advancing contact angle. Therefore, before the first contact angle is measured, the contact angle of the meniscus with the surface at the first position, which may not yet be the substantially maximum advancing contact angle, may need to be advanced across the surface from the first position to an advanced position. The advanced position corresponds with a boundary of an area of the surface contacted by the first liquid at a maximum advanced position of the edge of the meniscus on the surface. In other words the advanced position corresponds with the maximum area of the surface contacted by the first liquid. Advancing of the edge of the meniscus across the surface from the first position to the advanced position is controlled in examples using the control system 53. For example, by recording at least one first image of the first liquid on the surface as the edge of the meniscus is advanced across the surface, the control system may be configured to stop dispensing further of the first liquid and therefore stop advancing the edge of the meniscus across the surface at a desired moment in time. This moment may be when a diameter of the area of the surface contacted by the first liquid reaches a predetermined maximum diameter, which may be pre-programmed into the computer program instructions held stored by the at least one memory. In these examples a diameter corresponds to any area of the surface contacted by the first liquid and which is substantially circular due to the first liquid being applied for example as a droplet to the surface. However, in other examples a different dimension than a diameter may be measured to identify when the edge of the meniscus has reached an advanced position. Typically, substantially circular includes a circular shape with variations in shape within acceptable tolerances, for example due to irregularities on the surface which cause a deviation from a circular shape.

Therefore, in these examples, as the substantially maximum contact angle is not achieved until advancing the edge of the meniscus from the first position, the control system 53 may be configured to start measuring the first contact angle when the edge of the meniscus has reached a second position on the surface, which second position is outwards from the first position and corresponds with a second area of the surface contacted by the first liquid. The boundary 88 of the second area is illustrated in FIGS. 7*aiii* and 7*biii* and is larger than the first area (shown with dashed line 86). The control system 53 may identify when the second position has been reached by the advancing edge of the meniscus when a predetermined diameter of the second area is obtained. Thus a position of the edge of the meniscus on the surface for determining the first contact angle may be determined. Then, advancing the edge of the meniscus across the surface is continued with the first contact angle (in this example the substantially maximum advancing contact angle) being measured as the edge of the meniscus is advanced from the second position to a third position on the surface, the third position being outwards of the second position and corresponding with a third area of the surface which in these examples is identified as having been reached when a predetermined diameter of the third area is obtained. It is to be appreciated that the diameter of the area of the surface contacted by the first liquid, and the first contact angle, are measured in these examples using the control system 53 analysing at least one image recorded by the camera 56.

In the examples illustrated using FIGS. 7*ai* to 7*aviii* and FIGS. 7*bi* to 7*bviii* the third position is the advanced position and therefore the third area is the area contacted by the first liquid with the edge of the meniscus advanced to the maximum advanced position. A boundary of the third area is labelled with reference no. 90 in FIGS. 7*aiv* and 7*biv*. The third area is larger than the first and second areas, which are shown with dashed lines 86, 88 in FIG. 7*biv* for reference.

Thus, the first contact angle in these examples is determined, for example measured, during the advancing of the edge of the meniscus from the first position to the advanced position, though not in these examples for the entire duration of advancing from the first position to the advanced position, but instead for a shorter duration of advancing the edge of the meniscus from the second position to the third position. In this way, the first contact angle is the substantially maximum advancing contact angle at least for the duration it is determined, for example measured.

If the first contact angle is determined, for example measured, at multiple moments in time during the advancing of the edge of the meniscus from the second position to the third position, in some examples an average may be calculated of each of the measured first contact angles to calculate the substantially maximum advancing contact angle. Further, in some examples, a first contact angle may in a similar manner be measured for the left hand side contact angle of the imaged cross section of the first liquid.

A second contact angle between the surface and the edge of the meniscus of the first liquid may then be measured, in accordance with examples such as that of FIGS. 7*ai* to 7*aviii* and 7*bi* to 7*bviii*.

In order to measure the second contact angle in examples, the dispensing system is used to suck the first liquid from the volume of the first liquid contacting the surface, thereby removing first liquid from the surface and reducing the volume of first liquid on the surface. Once starting to remove the first liquid in this way the contact angle changes from the substantially maximum advancing contact angle towards a substantially maximum receding contact angle (which in these examples is the second contact angle). However, when starting to remove the first liquid the substantially maximum receding contact angle is not obtained immediately, due to the hysteresis explained previously. Therefore, to start with, whilst the contact angle changes, the area of the surface contacted by the first liquid does not change immediately. This is illustrated with FIGS. 7*av* and 7*bv* which show a changed contact angle compared with the substantially maximum advancing contact angle of previous FIG. 7*aiv* but the same area, for example the third area in this example, contacted by the first liquid as contacted by the first liquid in previous FIG. 7*biv*. As further of the first liquid is removed by the dispensing system, the edge of meniscus begins to recede across the surface. During the receding the edge of the meniscus of the first liquid to the receded position at least some of the first liquid is removed to reduce a size of an area of the surface contacted by the first liquid. With a sufficient rate of removal of the first liquid for example, the contact angle changes sufficiently to become the substantially maximum receding contact angle which is then measured. The method in such examples comprises receding the edge of the meniscus to a receded position on the surface and during the receding measuring a second contact angle. During the receding of the edge of the meniscus from for example the advanced position to the receded position, the edge of the meniscus moves across the surface to a fourth position from the advanced position. The fourth position is inwards of the third position and corresponds with a fourth area of the surface contacted by the first liquid, the boundary 92 of the fourth area being shown in FIG. 7avi. The fourth area is less than, in other words smaller than, the third area which is shown with a dashed line in FIG. 7bvi. By the time the edge of the meniscus reaches the fourth position, the contact angle is the substantially maximum receding contact angle and therefore measuring the second contact angle may begin. The reaching of the fourth position by the edge of the meniscus may be identified by measuring a diameter of the area of the surface contacted by the first liquid, for example when the diameter is a predetermined diameter corresponding to the fourth area. Thus a position of the edge of the meniscus on the surface for determining the second contact angle may be determined. The edge of the meniscus is then receded further across the surface from the fourth position to a fifth position inwards of the fourth position and corresponding to a boundary of a fifth area of the surface adjoined by the first liquid. The fifth area may have a smaller area than the fourth area and the boundary 94 of the fifth area is shown in FIG. 7bvii. The boundaries of the third and fourth areas are respectively shown in FIG. 7bvii with dashed lines 92, 94. The edge of the meniscus reaching the fifth position may be identified by measuring the diameter of the area of the surface contacted by the first liquid and identifying when the diameter is a predetermined diameter of the fifth area. The second contact angle is measured during the receding of the edge of the meniscus between the fourth position and the fifth position. The fifth position in this example is the receded position, though in other examples may be a different position. Measuring the second contact angle may therefore be performed using at least one second image recorded by the camera during the receding of the edge of the meniscus to the receded position but not in these examples for the entire duration of receding the meniscus edge, but instead for a shorter duration of receding the edge of the meniscus from the fourth position to the fifth position. Thus, the second contact angle is the substantially maximum receding contact angle at least for the duration it is measured.

After measuring the first contact angle and also in the appropriate examples the second contact angle also, the dispenser may be moved away from the surface so as to separate the first liquid from the opening of the dispenser. In this way the droplet may be left on the surface, on an area corresponding for example to the fifth area. This is illustrated in FIGS. 7aviii and 7bviii.

After measuring the first contact angle and also in the appropriate examples the second contact angle also, at least one second parameter value of respectively the at least one of the surface treatment control parameter may be determined based on the first contact angle and in the appropriate examples the second contact angle too. Then, based on the at least one second parameter value, the at least one surface treatment control parameter may be changed, for example controlled. Thus, the changing the at least one value of the surface treatment control parameter may be based on, for example dependent on, the first contact angle and in the appropriate examples also the second contact angle. In this way, based on the first contact angle and in some examples the second contact angle, the surface treatment environment for treating the surface may be changed by changing the at least one parameter value of the at least one surface treatment control parameter from at least one first parameter value to at least one second parameter value of the at least one surface treatment control parameter.

Determining at least one second parameter value of respectively the at least one surface treatment control parameter may for example be performed on the basis of a comparison of the measured first contact angle and in the appropriate examples the measured second contact angle too against a target first contact angle and in appropriate examples also a target second contact angle. The target first and where appropriate second target contact angles may be stored in the at least one memory of the control system 53. Then, if it is known at what time during the treatment process the measuring of the first and where appropriate second contact angles are measured, those measured first and second contact angles may be compared with the target first and where appropriate second contact angles to identify if the surface treatment is progressing in accordance with a predetermined progress of the treatment. For example, the at least one memory may store data indicative of a target first contact angle and where appropriate a target second contact angle at a plurality of moments of time for the duration of the surface treatment method. If the measured first contact angle and/the second contact angle is not sufficiently equal to the target first and/or second contact angle, at least one parameter value of the at least one surface treatment control parameters may be adjusted to tune the treating of the surface to more closely follow the target course of the treatment of the surface, for example to follow more closely a target rate of change of the first and/or second contact angle over time.

In some examples, the method comprises calculating a first surface energy of an area of the surface which may be considered indicative of a surface energy of the majority of the surface being treated. For example, where a static contact angle is measured, a first surface energy of the first area contacted by the first liquid may be calculated. If the calculated surface energy is different from a target surface energy at a given time during the treatment process, at least one of the surface treatment control parameters may be controlled in dependence on the calculated first surface energy, by for example changing the at least one surface treatment control parameter based on at least one second parameter value determined on the basis of the calculated first surface energy.

In examples where the first contact angle and the second contact angle are measured, a first surface energy may be calculated for an area located between the boundary of the area corresponding with the receded position and the boundary corresponding with the area corresponding with the advanced position, for example between the fourth and fifth positions. This area may be referred to as an intermediate area as it lies between the two positions. Although the first surface energy may be calculated for the intermediate area, the calculated first surface energy may be taken as the surface energy of a majority of the surface when the first and second contact angles were measured.

In some examples, the method may comprise calculating an equilibrium contact angle between the surface and the edge of the meniscus of the first liquid, using the first contact angle and the second contact angle. At least one of the surface treatment control parameters may then be controlled in dependence on a first surface energy calculated for the intermediate area using the equilibrium contact angle, by for example changing at least one parameter value of the at least one surface treatment control parameters on the basis of at least one second parameter value determined on the basis of the equilibrium contact angle. The equilibrium contact angle may be used in accordance with equations (1) to (5) described earlier. The calculated first surface energy may be taken as the surface energy of a majority of the surface when the first and second contact angles were measured. Similar to the example given further above, if the first surface energy calculated using the first and second contact angles, for example the equilibrium contact angle, differs from a target surface energy for a given time during the treating of the surface, at least one parameter value of the surface treatment control parameters may be adjusted, for example determined or changed, based on the measured surface energy, to maintain or bring the surface energy closer to a target surface energy of the surface for the given time during the treating of the surface.

In some examples, the method of controlling treatment of the surface includes measuring a contact angle for a second liquid applied on a different first area of the surface. The first area on which the second liquid is applied is different from the first area on which the first liquid is applied. The second liquid may be the same liquid as the first liquid, but a separate volume of liquid, for example a separate or different droplet than of the first liquid. In some such examples the second liquid may be applied on the different first area of the surface substantially simultaneously as the applying the first liquid on the first area of the surface as describe above. Typically, substantially simultaneously is a near simultaneous or simultaneous application of the first and second liquids on the respective first areas of the surface. For example, with substantially simultaneous application, the first and second liquids may be applied to the respective first areas of the surface at the same moment in time within acceptable variations due to timing inaccuracies. The first contact angle and in some examples the second contact angle may be measured for the second liquid in accordance with any of the example methods described above for the first liquid. Such first and second contact angles for the second liquid may be referred to respectively as the first second liquid contact angle and the second second liquid contact angle. Thus, at least one of the surface treatment control parameters may be controlled, for example by changing at least one surface treatment control parameter on the basis of at least one second parameter value determined on the basis of the first second liquid contact angle and where appropriate also the second second liquid contact angle between the surface and the edge of the meniscus of the second liquid. In some examples an average of the first contact angles for the first and second liquids may be calculated and used as the first contact angle on which the at least one second parameter value of the at least one surface treatment control parameter is determined, for then changing cthe at least one surface treatment parameter and/or for calculating the surface energy of an area of the surface. Similarly, an average of the second contact angles for the first and second liquids may be calculated and used as the second contact angle on which the changing the at least one parameter value of the at least one surface treatment control parameter is based and/or for calculating the surface energy of an area of the surface.

In alternative examples, the second liquid may be applied on the different first area after elapse of a predetermined time period from the applying the first liquid on the first area of the surface. A first second liquid contact angle and in some examples a second second liquid contact angle may be measured, in a similar manner as described in examples previously, and at least one surface treatment control parameter may be controlled for example by changing at least one parameter value of the at least one surface treatment control parameter, in accordance with at least one parameter value determined on the basis of the first second liquid contact angle and in some examples also the second second liquid contact angle. In such examples, a surface energy difference may be calculated between a first surface energy (calculated using the first contact angle and in some examples the second contact angle) for the first liquid and a second surface energy (calculated using the first second liquid contact angle and in some examples the second second liquid contact angle) for the second liquid. Using this surface energy difference, a rate of surface energy change of the surface may be calculated. Therefore, a remaining time period until a target surface energy of the surface is obtained by the treating of the surface may be calculated, for example by extrapolating the rate of the treatment. Controlling the at least one surface treatment control parameter may then include determining at least one second parameter value of respectively the at least one surface treatment control parameter to cease the treating the surface upon expiry of the calculated remaining time period and changing the at least one surface treatment control parameter in accordance with the at least one second parameter value.

In further examples, the second liquid may be a different liquid than the first liquid. For example, the first liquid may be a polar liquid and the second liquid may be a non-polar liquid. Typically, polar is for example a property of at least one compound having a molecule with a net dipole, for example that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more atom to atom bonds in the molecule, with for example one of the atoms being a heteroatom such as oxygen or nitrogen. For example, such a polar atom to atom bond is a bond between an oxygen (O) atom and a hydrogen (H) atom, i.e. an —O—H bond. A non-polar liquid is for example a liquid without the polar property described above.

By using different liquids for the first and second liquids, it may be possible to more accurately control the treatment of the surface, due to the different behaviour of the first and second liquids when interacting with the surface (due to their different surface energies). Further, for example, the treatment process may change a surface tension of the liquid on the surface, which change may be different for the first liquid compared with the second liquid. Therefore, using different liquids for the first and second liquids can aid a more accurate monitoring of the surface treatment.

In examples where a second liquid is applied on an area of the surface, for example for measuring the first second liquid contact angle and in some examples the second second liquid contact angle, a plurality of the apparatus for the controlling the treatment of the surface may be used. For example, a second dispensing system, a second dispenser actuation system, possibly a second camera, and possibly a second at least one memory and at least one processor, all which may be similar to those features described previously, may be used for measuring the contact angle using the second liquid. In other examples the same camera may be used and the same control system may be used for measuring the contact angle for the first and second liquids. It is envisaged that further liquids may be applied to the surface either substantially simultaneously as the first and second liquids, or separated by predetermined time periods, to calculate respectively a more accurate average surface energy, or a more accurate rate of surface energy change or to monitor progress of the treating of the surface for longer. Further apparatus for dispensing the further liquids and measuring the contact angles may be used.

Figure 8:
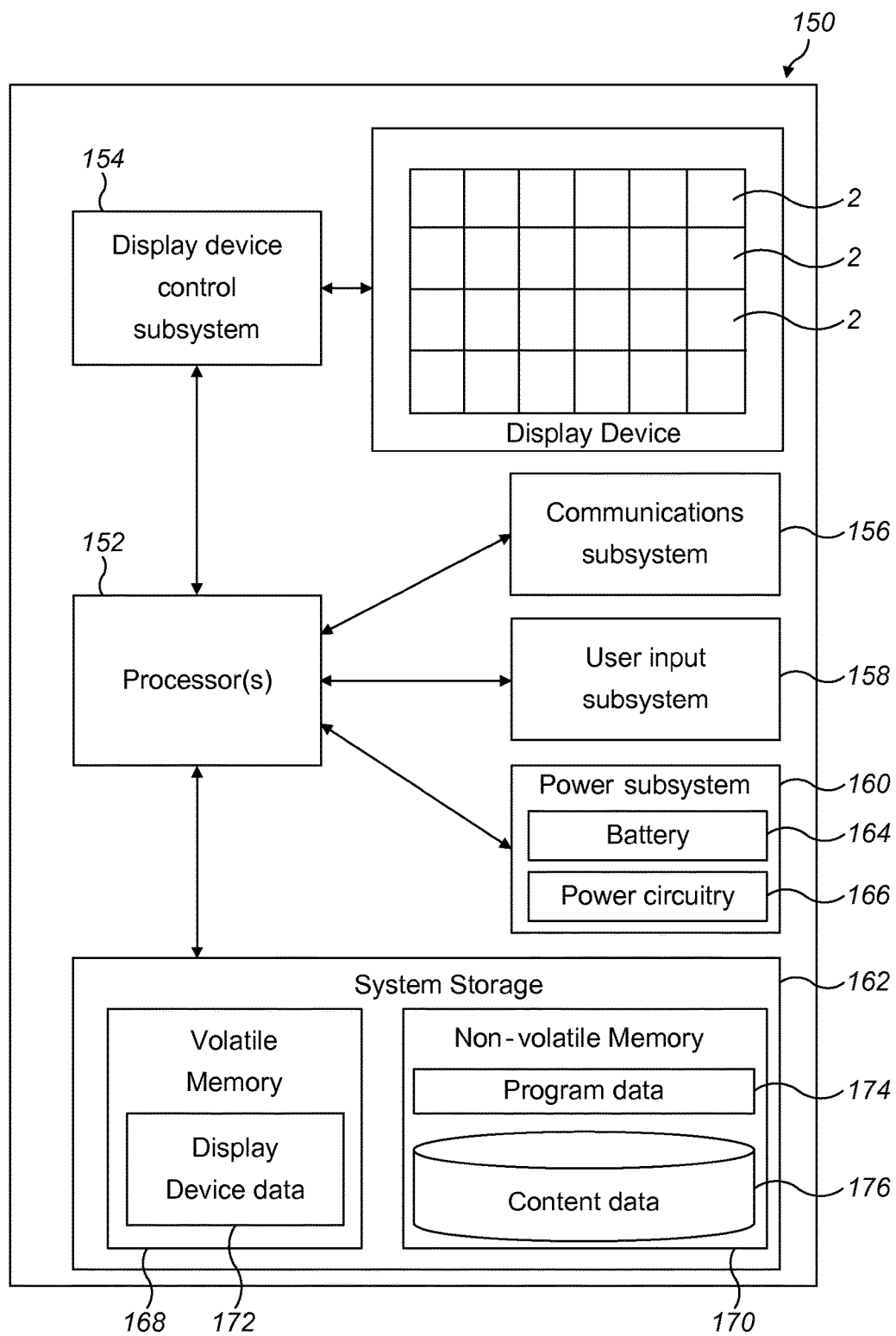
FIG. 8 shows schematically an example of a system.

FIG. 8 shows schematically a system diagram of an example system, for example apparatus 150, comprising an electrowetting display device such as any of the examples described above, for example the electrowetting display device described above comprising electrowetting display elements 2. The apparatus is for example a portable, for example mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 150. The apparatus includes at least one processor 152 connected to and therefore in data communication with for example: a display device control subsystem 154, a communications subsystem 156, a user input subsystem 158, a power subsystem 160 and system storage 162. The display device control subsystem 154 is connected to and is therefore in data communication with the display device. The at least one processor 152 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 162. The at least one processor may additionally, or in the alternative, contain memory, such as processor registers.

The display device control subsystem 154 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 156 for example is configured for the apparatus to communicate with for example a computing device via a data network, for example a computer network such as the Internet, a local area network, a wide area network, a telecommunications network, a wired network, a wireless network, or some other type of network. The communications subsystem 156 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 158 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 160 for example includes power circuitry 166 for use in transferring and controlling power consumed by the apparatus. The power may be provided by a mains electricity supply or from a battery 164, via the power circuitry. The power circuitry may further be used for charging the battery from a mains electricity supply.

The system storage 162 includes at least one memory, for example at least one of volatile memory 168 and non-volatile memory 170 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, for example computer program instructions. Therefore, the at least one memory and the computer program instructions may be configured to, with the at least one processor, control a display effect provided by the electrowetting display device.

In the example of FIG. 8, the volatile memory 168 stores for example display device data 172 which is indicative of display effects to be provided by the display device. The processor 152 may transmit data, based on the display device data, to the display device control subsystem 154 which in turn outputs signals to the display device for applying voltages to the display elements, for providing display effects from the display device. The non-volatile memory 170 stores for example program data 174 and/or content data 176. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above examples are to be understood as illustrative. Further examples are envisaged.

Examples of a method of controlling a treatment of a surface are described above. Many examples are described in the context of treating a surface of a support plate for an electrowetting element, for example a first support plate. However, it is to be noted that further examples are envisaged where the surface is of a different structure, which may be a support plate, for a different application. For example, the method of examples described herein may be used during a treating process pf a surface to increase a hydrophilicity of the surface, for example so that a resist material or an etching agent will wet the resulting surface. Other examples may include a treatment to increase a hydrophobicity of a surface. The skilled person will appreciate treatment processes during which the method of examples described herein may be used.

Examples are described above using advancing of an edge of a meniscus then receding the edge. It is envisaged in alternative examples that the edge of the meniscus may be first receded across the surface then advanced over the surface.

In examples methods of calculating a surface energy are described using an advancing contact angle and a receding contact angle. It is to be appreciated that other techniques may be used in further examples. For example, a contact angle with a droplet or volume of the liquid having been applied to an area of the surface may be measured without advancing or contracting the edge of the meniscus over the surface. This may offer sufficient accuracy for calculating a surface energy of the surface. Alternatively, an advancing contact angle and a receding contact angle may be measured but without moving the edge of the meniscus across the surface; in such an example the volume of the liquid may be increased or decreased to the extent that the maximum advancing contact angle or the maximum receding contact angle, respectively, may be obtained, but without increasing or decreasing the volume any further such that the edge of the meniscus moves across the surface.

Figure 9:
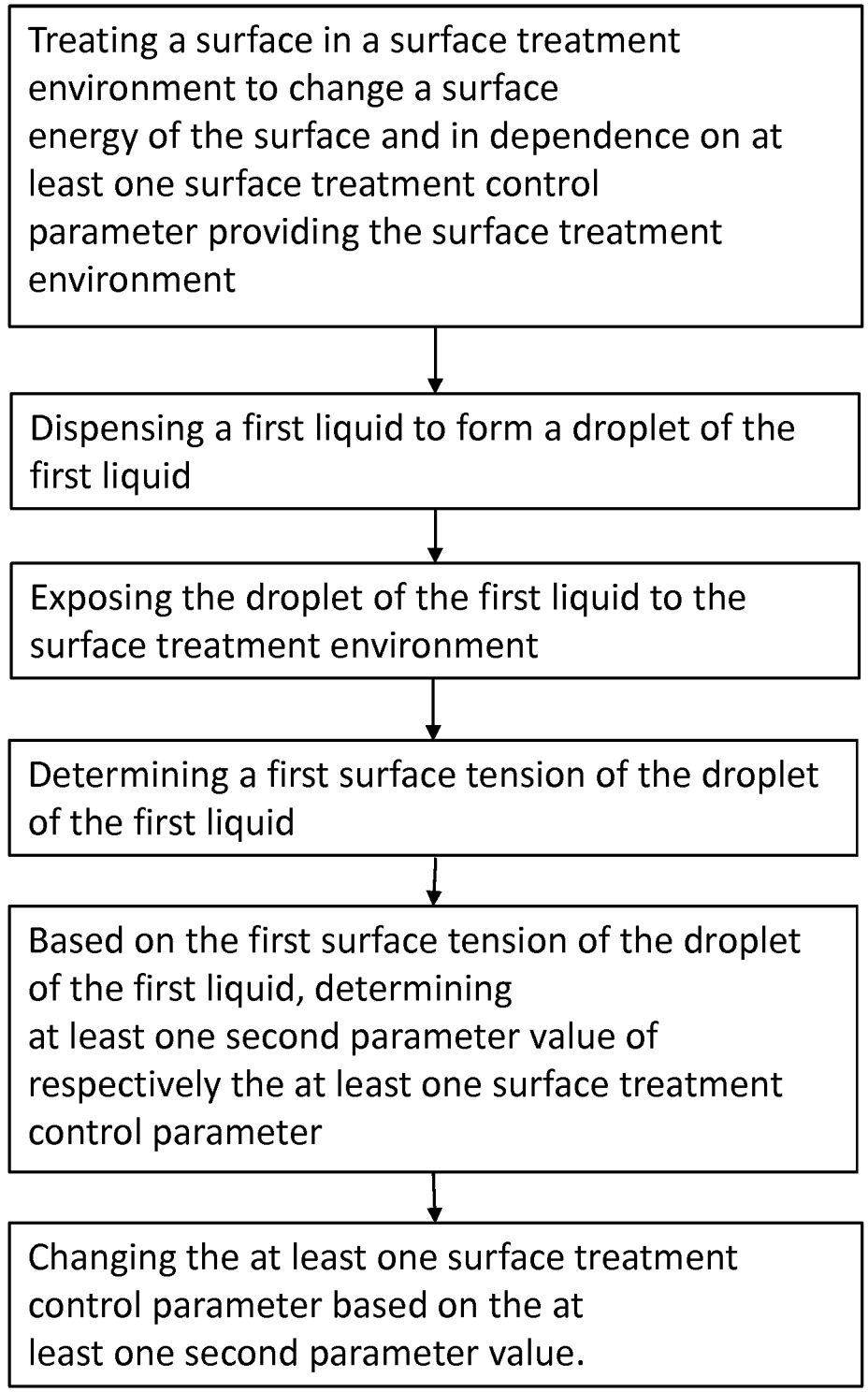
FIG. 9 is a flow diagram of an alternative method of controlling treatment of a surface according to examples.

In further examples, for example in accordance with the method of FIG. 9, a droplet of the first liquid may not be applied to a surface undergoing a method of treatment. Instead, it may be possible to determine, for example measure, a surface tension of a droplet of the first liquid, for example as described above using FIGS. 7*ai* and 7*bi*; the corresponding description should be taken to apply here also where appropriate. In this way, it is the effect of the surface treatment process on the properties of the first liquid that may be used to determine at least one second parameter value of respectively the at least one surface treatment control parameter, and to change the surface treatment control parameter based on the at least one second parameter value, to control the treatment. For example, at the start of a surface treatment process the first liquid may have a first surface tension. As the surface treatment progresses, the surface tension of the first liquid may change and that changed surface tension may be determined, for example measured, using the camera for example as described above. The change in surface tension may be correlated for example by the control system against data indicative of an expected surface energy of the surface for a given surface tension value of the first liquid. For such examples, it may be necessary to have determined the surface tension of the first liquid before starting the surface treatment process and also the surface energy of the surface before starting the surface treatment process, so the correlation between the change of the surface tension of the first liquid droplet and the expected change of the surface energy of the surface may be determined.

In such examples, for example those described in the preceding paragraph, a method of controlling treatment of a surface is provided. This method may for example therefore comprise treating a surface in a surface treatment environment, which environment is for example particular to the surface treatment process being used. The environment may be set at a particular temperature and/or pressure, and a treatment gas may be present. It is to be appreciated that the surface treatment environment will depend on the surface treatment being applied, as the skilled person will understand. The surface treatment process is performed in dependence on at least one surface treatment control parameter, for example any of those listed above for other examples. A first liquid may be dispensed for example by the dispenser described earlier. The first liquid is for example dispensed to form a droplet of the first liquid, so as for example to pend or hang from the opening of the dispenser. The droplet of the first liquid may then have its surface tension determined, before starting of the surface treatment, for example using the method described above with respect to FIGS. 7*ai* and 7*bi*, for example as a calibration. The surface energy of the surface to be treated may also be determined, for example using a liquid applied to the surface and determining a contact angle of an edge of the meniscus of that liquid with the surface, using a method for example as described elsewhere herein, or alternatively using a surface energy measuring device available from Krüss GmbH for example which is usable to measure the surface energy of the surface to be treated before being placed in apparatus for applying the surface treatment. The surface treatment may then be started on the surface, in the surface treatment environment.

The droplet of the first liquid is exposed to the surface treatment environment for example for the duration of applying the surface treatment to the surface. During the surface treatment, the surface tension of the droplet may be determined at least once, for example using the method described using FIGS. 7*ai* and 7*bi*. Thus, over time, as the surface treatment progresses, an expected surface energy of the surface may be determined, based on the surface tension of the first liquid droplet determined during the surface treatment process. As a result, in a similar manner as described earlier in examples, at least one of the surface treatment control parameters may be controlled by changing at least one second parameter value of the at least one surface treatment control parameter to for example ensure that a target surface energy of the surface is obtained. For example, a first surface tension of the droplet of the first liquid may be determined at a first moment in time during the treating of the surface and a second surface tension of the droplet of the first liquid may be determined at a second moment in time during the treating of the surface. At least one parameter value of the at least one surface treatment control parameter may determined on the basis of the second surface tension of the droplet of the first liquid. For example, based on a difference between the first surface tension and the second surface tension, the at least one surface treatment control parameter value may be determined to cease the treating the surface upon expiry of a remaining time period for obtaining a target surface energy of the surface. The remaining time period may be based on a difference between the first surface tension and the second surface tension. For example, this difference may be used to determine a rate of change of an expected surface energy of the surface, which rate may be extrapolated to determine when the target surface energy of the surface would be obtained. The treating of the surface may then be ceased when it is expected that the target surface energy of the surface has been obtained.

Thus, at least one of the surface treatment control parameters may be controlled, by changing at least one parameter value thereof, based on the surface tension of the droplet of the first liquid and therefore in dependence on the expected surface energy of the surface. Thus, an alternative method of controlling the surface treatment of the surface is provided, which does not require the first liquid to be applied to the surface during the surface treatment process, which might otherwise for example involve advancing and receding the edge of the meniscus over the surface as described above. In some examples however, it may be desirable instead to use the method described in examples above with reference to FIGS. 7*ai* to 7*aviii* and 7*bi* to 7*bviii* for example, as applying the first liquid on the surface and determining the contact angle may give a more accurate determination of the surface energy than where the first liquid is not applied to the surface (with the surface energy being determined as an expected surface energy in correlation with the surface tension of the droplet of the first liquid, rather than being based on a direct interaction of the first liquid with the surface).

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of controlling treatment of a surface, comprising:
   treating the surface to change a surface energy of the surface, in dependence on a first parameter value of a surface treatment control parameter;
   applying a first liquid part on a first area of the surface, the first liquid part having a meniscus with an edge contacting the surface;
   after the applying the first liquid part on the first area of the surface, dispensing first liquid on the surface to advance the edge from a first position on the surface to an advanced position on the surface;
   determining a first contact angle between the surface and the edge;
   removing first liquid from the surface to recede the edge to a receded position on the surface;
   determining a second contact angle between the surface and the edge;
   based on the first contact angle and the second contact angle, determining a second parameter value of the surface treatment control parameter; and
   changing the surface treatment control parameter based on the second parameter value.

2. The method according to claim 1, wherein:
   the determining the first contact angle is performed during the dispensing first liquid on the surface to advance the edge from the first position on the surface to the advanced position on the surface, and
   the determining the second contact angle is performed during the removing first liquid from the surface to recede the edge to the receded position on the surface.

3. The method according to claim 1, wherein:
   the dispensing first liquid on the surface to advance the edge from the first position on the surface to the advanced position on the surface comprises dispensing first liquid on the surface to advance the edge from a second position on the surface outwards of the first position on the surface, to a third position on the surface outwards of the second position on the surface,
   the determining the first contact angle comprises determining the first contact angle during the dispensing first liquid to advance the edge from the second position on the surface to the third position on the surface,
   the removing first liquid from the surface to recede the edge to the receded position on the surface comprises removing first liquid from the surface to recede the edge from a fourth position on the surface inwards of the third position on the surface, to a fifth position on the surface inwards of the fourth position on the surface, and
   the determining the second contact angle comprises determining the second contact angle during the removing first liquid to recede the edge from the fourth position on the surface to the fifth position on the surface.

4. The method according to claim 1, further comprising:
   measuring a diameter of an area of the surface contacted by the first liquid part to determine a position of the edge on the surface for the determining the first contact angle; and
   measuring a diameter of an area of the surface contacted by the first liquid part to determine a position of the edge on the surface for the determining the second contact angle.

5. The method according to claim 1, comprising:
determining that the first contact angle is a substantially maximum advancing contact angle for the determining the first contact angle; and
determining that the second contact angle is a substantially maximum receding contact angle for the determining the second contact angle.

6. The method according to claim 1, further comprising:
calculating a first surface energy of an intermediate area of the surface using the first contact angle and the second contact angle, the intermediate area of the surface located between the advanced position on the surface and the receded position on the surface,
wherein the determining the second parameter value of the surface treatment control parameter comprises determining the second parameter value of the surface treatment control parameter based on the first surface energy of the intermediate area of the surface calculated using the first contact angle and the second contact angle.

7. The method according to claim 1, further comprising:
calculating an equilibrium contact angle between the surface and the edge using the first contact angle and the second contact angle; and
calculating a first surface energy of an intermediate area of the surface using the equilibrium contact angle, the intermediate area of the surface located between the advanced position on the surface and the receded position on the surface,
wherein the determining the second parameter value of the surface treatment control parameter comprises determining the second parameter value of the surface treatment control parameter based on the first surface energy of the intermediate area of the surface calculated using the equilibrium contact angle.

8. The method according to claim 1, further comprising:
during the dispensing first liquid on the surface to advance the edge from the first position on the surface to the advanced position on the surface, dispensing more of the first liquid to increase a size of an area of the surface contacted by the first liquid part; and
during the removing first liquid from the surface to recede the edge to the receded position on the surface, removing at least some of the first liquid to reduce a size of an area of the surface contacted by the first liquid part.

9. The method according to claim 1, further comprising:
calculating a first surface energy of the first area of the surface using the first contact angle,
wherein the determining the second parameter value of the surface treatment control parameter comprises determining the second parameter value of the surface treatment control parameter based on the first surface energy of the first area of the surface calculated using the first contact angle.

10. The method according to claim 1, further comprising: recording an image of the edge contacting the surface,
wherein the determining the first contact angle between the surface and the edge uses the image to determine the first contact angle between the surface and the edge.

11. The method according to claim 1, wherein the surface treatment control parameter comprises at least one of:
a flow rate of a treatment gas into a chamber in which the treating the surface is performed;
a concentration of a treatment gas in a chamber in which the treating the surface is performed;
a composition of a mixture of treatment gases in a chamber in which the treating the surface is performed;
a temperature of an environment in which the treating the surface is performed;
a pressure of an environment in which the treating the surface is performed;
an intensity of radiation applied to the surface during the treating the surface;
a frequency of radiation applied to the surface during the treating the surface; or
a power of radiation applied to the surface during the treating the surface.

12. The method according to claim 1, further comprising, before the applying the first liquid part on the first area of the surface, determining a surface tension of the first liquid.

13. The method according to claim 1, further comprising:
applying a second liquid part on a different first area of the surface substantially simultaneously as the applying the first liquid part on the first area of the surface; and
determining a second liquid contact angle between the surface and an edge of a meniscus of the second liquid part,
the determining the second parameter value of the surface treatment control parameter comprising determining the second parameter value of the surface treatment control parameter based on the second liquid contact angle between the surface and the edge of the meniscus of the second liquid part.

14. The method according to claim 13, further comprising:
calculating an average surface energy of the surface using the first contact angle and the second liquid contact angle,
wherein the determining the second parameter value of the surface treatment control parameter comprises determining the second parameter value of the surface treatment control parameter based on the average surface energy.

15. The method according to claim 1, further comprising:
applying a second liquid part on a different first area of the surface after elapse of a predetermined time period from the applying the first liquid part on the first area of the surface;
determining a second liquid contact angle between the surface and an edge of a meniscus of the second liquid part;
the determining the second parameter value of the surface treatment control parameter comprising determining the second parameter value of the surface treatment control parameter based on the second liquid contact angle.

16. The method according to claim 15, further comprising:
calculating a surface energy difference between a first surface energy of the surface calculated using the first contact angle and a second surface energy of the surface calculated using the second liquid contact angle; and
calculating, using the surface energy difference, a remaining time period until a target surface energy of the surface is obtained by the treating the surface,
wherein the determining the second parameter value of the surface treatment control parameter comprises determining the second parameter value of the surface treatment control parameter to cease the treating the surface upon expiry of the remaining time period.

17. The method according to claim 10, wherein the image is a first image, the method further comprising:

during the removing the first liquid from the surface, recording a second image of the edge contacting the surface, the determining the second contact angle between the surface and the edge comprising analysing the second image.

18. The method according to claim 1, comprising:

during the dispensing first liquid, recording an image of the meniscus contacting the surface;

determining a diameter of an area of the surface contacted by the first liquid part based on the image; and in response to the diameter of the area of the surface contacted by the first liquid part being equal to or exceeding a predetermined diameter, ceasing the dispensing of first liquid.

19. The method according to claim 1, wherein the determining the second parameter value comprises determining the second parameter value based on a comparison between the first contact angle and a target first contact angle.

20. The method according to claim 1, comprising, after the applying the first liquid part on the first area of the surface, vibrating the first liquid part.

21. The method according to claim 1, wherein the first liquid part at least partly comprises water.

22. The method according to claim 13, wherein the first liquid is different from the second liquid.

23. The method according to claim 1, wherein the treating the surface comprises applying an ultraviolet ozone treatment to the surface.

24. A method of controlling treatment of a surface, comprising:

treating the surface to change a surface energy of the surface, in dependence on a first parameter value of a surface treatment control parameter;

applying a first liquid part on a first area of the surface, the first liquid part having a meniscus with an edge contacting the surface;

determining a first contact angle between the surface and the edge;

based on the first contact angle, determining a second parameter value of the surface treatment control parameter; and changing the surface treatment control parameter based on the second parameter value, wherein the surface treatment control parameter comprises at least one of:

a flow rate of a treatment gas into a chamber in which the treating the surface is performed;

a concentration of a treatment gas in a chamber in which the treating the surface is performed;

a composition of a mixture of treatment gases in a chamber in which the treating the surface is performed;

a temperature of an environment in which the treating the surface is performed;

a pressure of an environment in which the treating the surface is performed;

an intensity of radiation applied to the surface during the treating the surface;

a frequency of radiation applied to the surface during the treating the surface; or a power of radiation applied to the surface during the treating the surface.

\* \* \* \* \*